(12) United States Patent
Shie et al.

(10) Patent No.: US 11,991,485 B2
(45) Date of Patent: May 21, 2024

(54) PROJECTION APPARATUS

(71) Applicant: Coretronic Corporation, Hsin-Chu (TW)

(72) Inventors: Jen-Yu Shie, Hsin-Chu (TW); Kuang-Hsiang Chang, Hsin-Chu (TW); Hung-Pin Chen, Hsin-Chu (TW); Heng Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/862,405

(22) Filed: Jul. 12, 2022

(65) Prior Publication Data

US 2023/0015001 A1  Jan. 19, 2023

(30) Foreign Application Priority Data

Jul. 14, 2021 (CN) .......................... 202110793049.7

(51) Int. Cl.
*H04N 9/31* (2006.01)
*H04N 23/57* (2023.01)

(52) U.S. Cl.
CPC ........... *H04N 9/3194* (2013.01); *H04N 9/315* (2013.01); *H04N 9/3185* (2013.01); *H04N 9/3197* (2013.01); *H04N 23/57* (2023.01)

(58) Field of Classification Search
CPC .... G03B 21/006; G03B 21/008; G03B 21/28; G03B 21/145; G03B 21/147; G03B 21/2053; G03B 21/2066; H04N 9/315; H04N 9/317; H04N 9/3141; H04N 9/3185; H04N 9/3194; H04N 9/3197; H04N 23/57; H04N 23/58; H04N 23/60
See application file for complete search history.

(56) References Cited

U.S. PATENT DOCUMENTS

| 7,346,185 | B2 | 3/2008 | Grossman et al. |
| 8,042,948 | B2 * | 10/2011 | Powell ................... G03B 21/28 |
| | | | 359/479 |
| 11,619,867 | B2 * | 4/2023 | Furue ...................... G02B 5/10 |
| | | | 353/79 |

(Continued)

FOREIGN PATENT DOCUMENTS

| CN | 103324019 | 9/2013 |
| CN | 103324020 | 9/2013 |

(Continued)

OTHER PUBLICATIONS

"Office Action of Taiwan Counterpart Application", dated Dec. 14, 2022, p. 1-p. 5.

*Primary Examiner* — Sultan Chowdhury
(74) *Attorney, Agent, or Firm* — JCIPRNET (57) ABSTRACT

A projection apparatus including a projection device, a reflecting component, and an image capturing device is provided. The projection device is adapted to project an image light beam to form a projection image. The reflecting component is disposed on the projection device and has a reflecting surface. The image capturing device is disposed on the projection device and has an image capturing end. The image capturing end faces the reflecting surface. The reflecting surface is adapted to reflect the projection image to the image capturing end.

10 Claims, 6 Drawing Sheets

(56) References Cited

U.S. PATENT DOCUMENTS

| | | | | |
|---|---|---|---|---|
| 2009/0207383 A1* | 8/2009 | Hirahara | ................ | H04N 5/74 |
| | | | | 353/69 |
| 2011/0211175 A1* | 9/2011 | Stehle | ................... | G03B 37/06 |
| | | | | 353/121 |
| 2021/0325766 A1* | 10/2021 | Nakagoshi | ........... | H04N 9/3147 |
| 2021/0356739 A1* | 11/2021 | Yano | ................... | H04N 13/395 |

FOREIGN PATENT DOCUMENTS

| | | |
|---|---|---|
| CN | 103353704 | 10/2013 |
| TW | 201514605 | 4/2015 |
| TW | I484283 | 5/2015 |
| TW | I703400 | 9/2020 |

\* cited by examiner

PROJECTION APPARATUS

CROSS-REFERENCE TO RELATED APPLICATION

This application claims the priority benefit of Chinese application no. 202110793049.7, filed on Jul. 14, 2021. The entirety of the above-mentioned patent application is hereby incorporated by reference herein and made a part of this specification.

BACKGROUND

Technical Field

The disclosure relates to a display device, and particularly, to a projection apparatus.

Description of Related Art

In terms of a projection apparatus having an auto-focusing function, a camera thereof is generally configured to face a projection screen, such that the camera directly photographs the projection screen to accordingly determine whether the screen is clear, which is taken as a reference basis for auto-focusing. However, this design requires the photographing component and the projection lens to face the same direction and be disposed at a specific position and a specific angle, which limits the exterior design of the device as a whole. In addition, when the size of the projection screen is relatively large, the photographing may be adversely affected by insufficient viewing angle or aberration of the camera.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus, in which a configuration position and angle of an image capturing device are not limited and a projection screen can be smoothly captured.

The projection apparatus of the disclosure includes a projection device, a reflecting component, and an image capturing device. The projection device is adapted to project an image light beam to form a projection image. The reflecting component is disposed on the projection device and has a reflecting surface. The image capturing device is disposed on the projection device and has an image capturing end. The image capturing end faces the reflecting surface. The reflecting surface is adapted to reflect the projection image to the image capturing end. (In other words, the image capturing device can capture the projection image through the reflection on the reflecting surface.)

Based on the foregoing, in the projection apparatus of the disclosure, the projection image is reflected to the image capturing device by the reflecting component, instead of being directly captured by the image capturing device. Accordingly, the projection image can be correctly reflected to the image capturing device by adjusting the angle of the reflecting component, so that the configuration position and angle of the image capturing device are not limited. In addition, when the size of the projection image is relatively large, wide-angle reflection can be achieved by configuring the reflecting surface of the reflecting component as a convex surface, to prevent photographing from being adversely affected by insufficient viewing angle or aberration of the image capturing device. Thereby, the image capturing device can smoothly (e.g., wholly) capture the projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
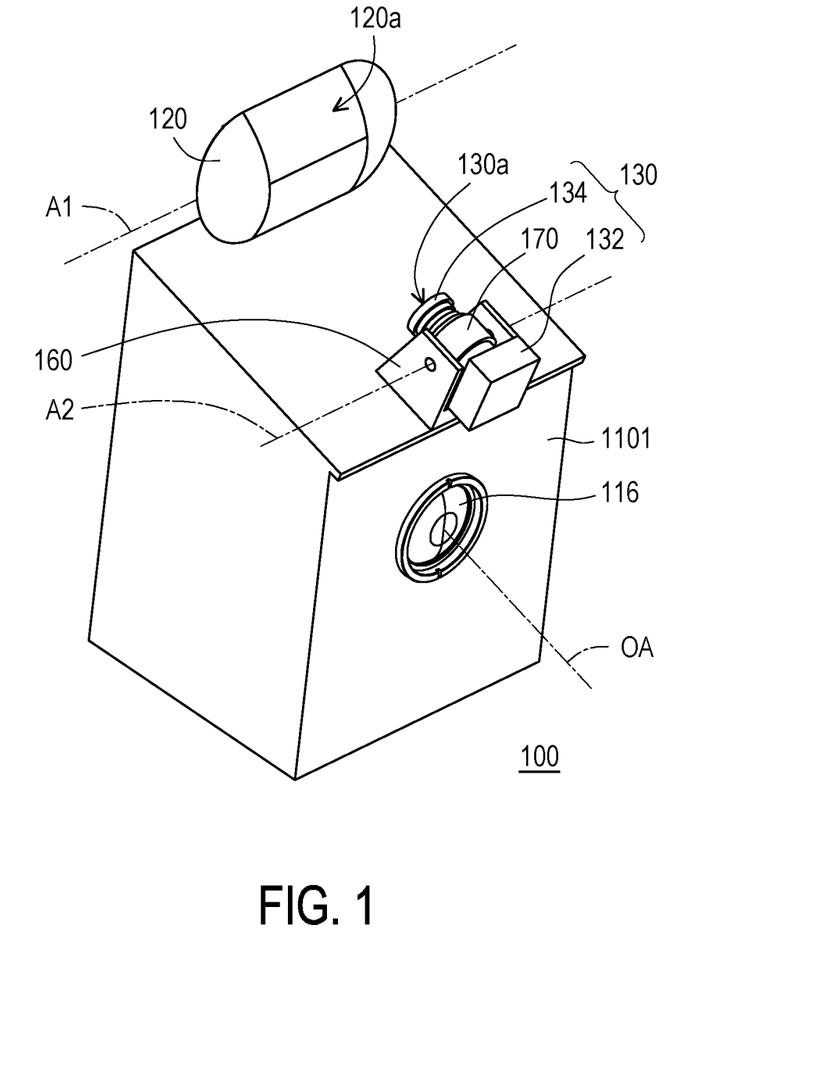
FIG. 1 is a three-dimensional view of a projection apparatus according to an embodiment of the disclosure.
Figure 2:
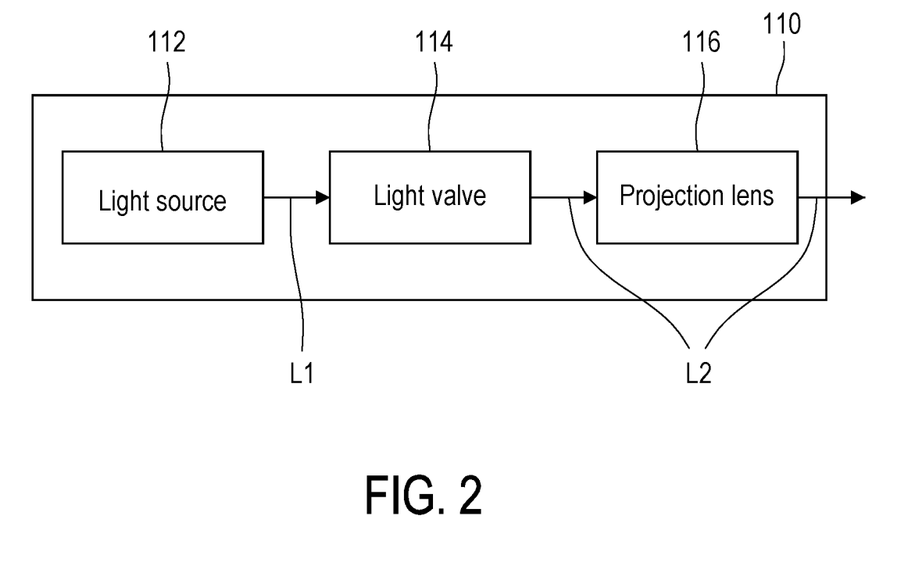
FIG. 2 is a schematic view of a projection device of FIG. 1.
Figure 3:
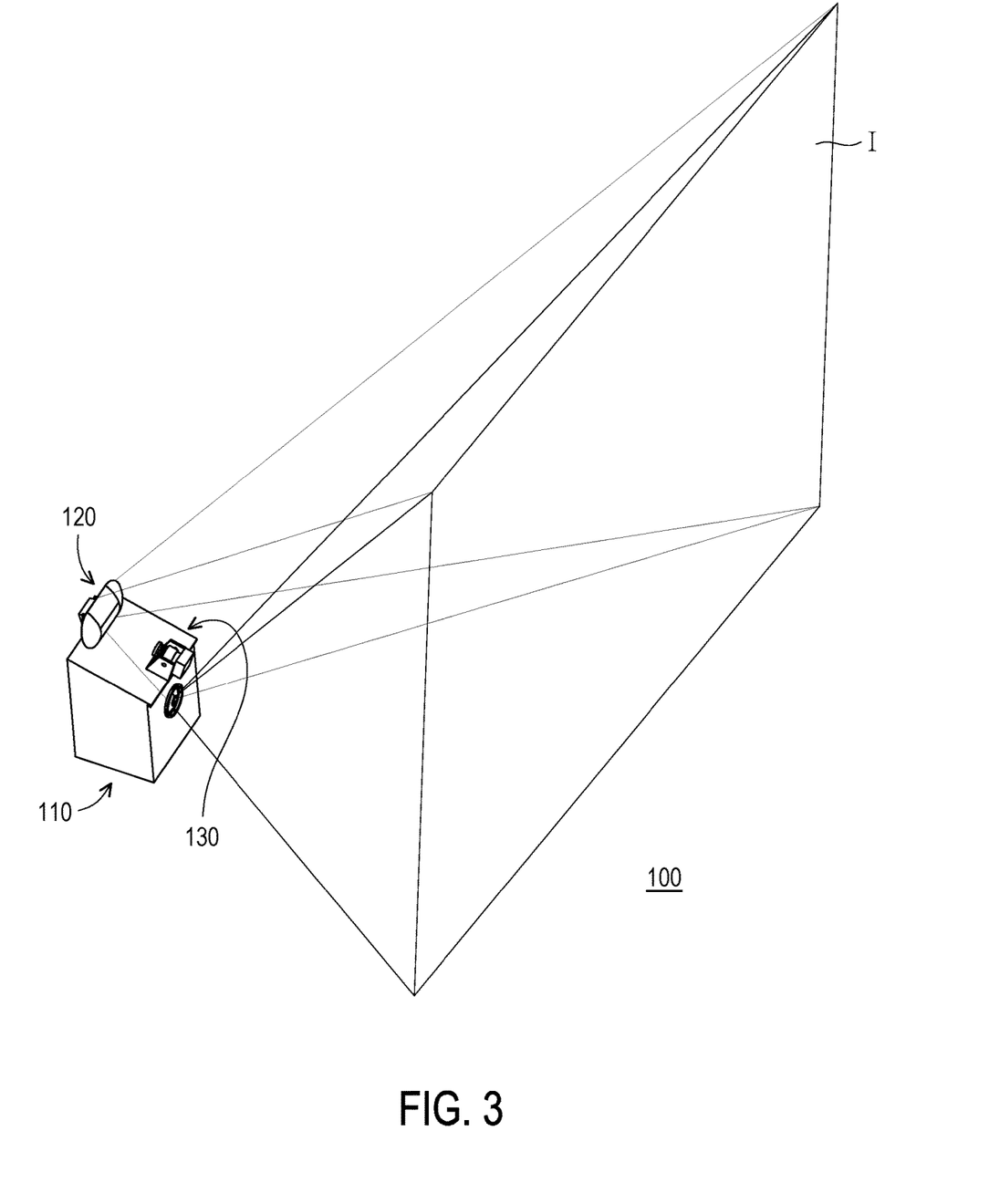
FIG. 3 shows the projection apparatus of FIG. 1 projecting a projection image.

FIG. 1 is a three-dimensional view of a projection apparatus according to an embodiment of the disclosure. FIG. 2 is a schematic view of a projection device of FIG. 1. FIG. 3 shows the projection apparatus of FIG. 1 projecting a projection image. With reference to FIG. 1 to FIG. 3, in this embodiment, a projection apparatus 100 includes a projection device 110, a reflecting component 120, and an image capturing device 130. The projection device 110 includes a light source 112, a light valve 114, and a projection lens 116. The light source 112 is adapted to generate an illumination light beam L1. The light valve 114 is adapted to convert the illumination light beam L1 into an image light beam L2. The projection lens 116 is adapted to project the image light beam L2 toward the front of the projection apparatus 100 to form a projection image I. The projection image I, for example, is projected onto a projection target such as a wall or a projection screen for display.

The reflecting component 120 is disposed on the projection device 110 and has a reflecting surface 120a. The reflecting surface 120a is a mirror surface, for example, and faces the front of the projection apparatus 100. The image capturing device 130 is disposed on the projection device 110 and has an image capturing end 130a. The image capturing end 130a faces the reflecting surface 120a of the reflecting component 120 and faces away from the front of the projection apparatus 100. The reflecting surface 120a is adapted to reflecting the projection image I to the image capturing end 130a. By the projection image I captured by the image capturing end 130a, the projection apparatus 100 can determine whether the projection screen is clear, which is taken as a reference basis for auto-focusing.

As described above, in the projection apparatus 100 of this embodiment, the projection image I is reflected to the image capturing device 130 by the reflecting component 120, instead of being directly captured by the image capturing device 130. Accordingly, the projection image I can be correctly reflected to the image capturing device 130 by adjusting the angle of the reflecting component 120, so that the configuration position and angle of the image capturing device 130 are not limited.

Further, in this embodiment, the reflecting surface 120a of the reflecting component 120 is, for example, a convex arc surface. When the size of the projection image I is relatively large, wide-angle reflection can be achieved by configuring the reflecting surface 120a of the reflecting component 120 as a convex surface (e.g., the convex arc surface mentioned above), to prevent photographing from being adversely affected by insufficient viewing angle or aberration of the image capturing device 130. (e.g., can't photograph the whole projection image.) Accordingly, the image capturing device 130 can smoothly capture the projection image I. In other embodiments, the reflecting surface 120a may be configured as a reflecting surface in a planar form or in other forms depending on requirements, which is not limited by the disclosure.

Figure 4:
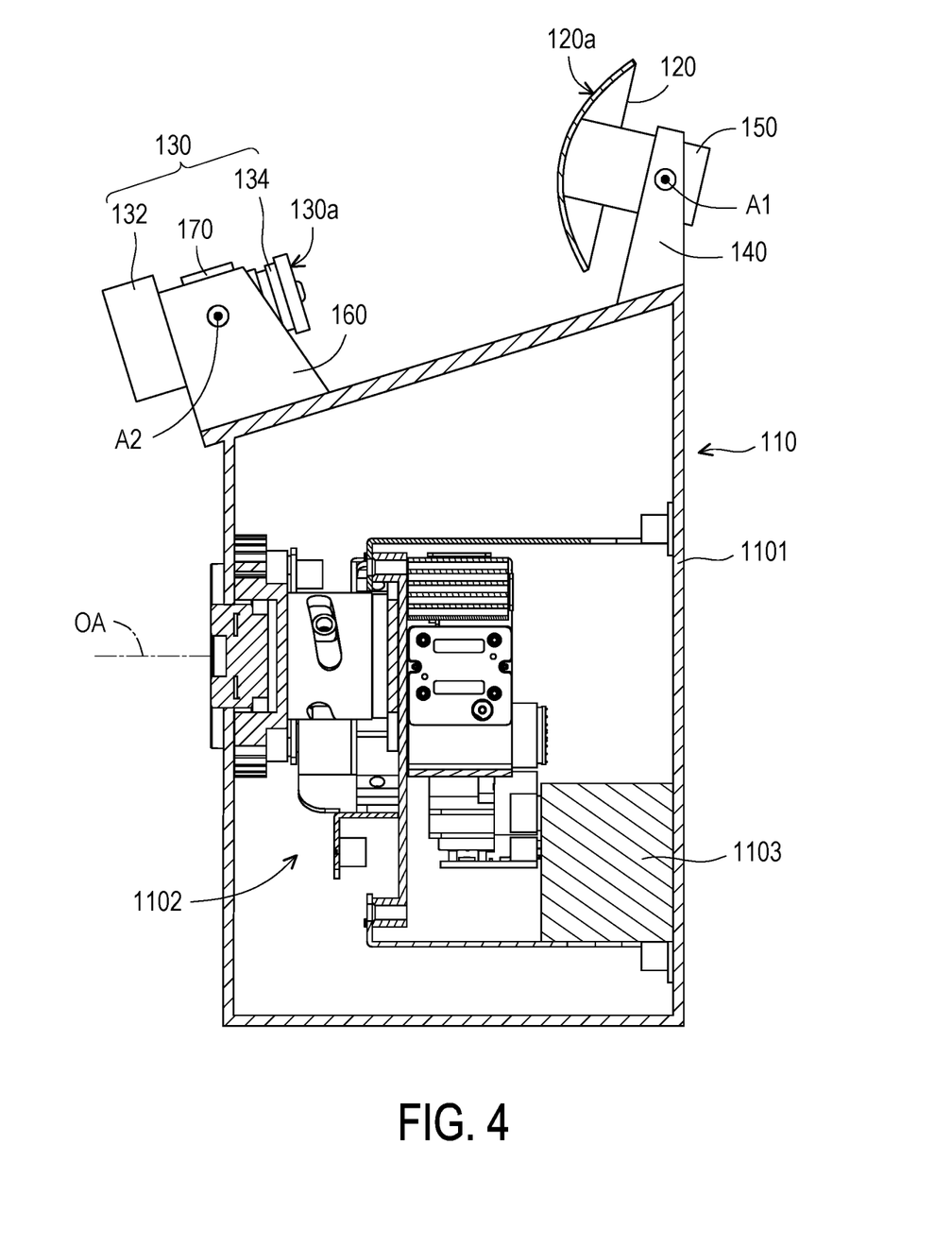
FIG. 4 is a side view of partial structures of the projection apparatus of FIG. 1.
Figure 5:
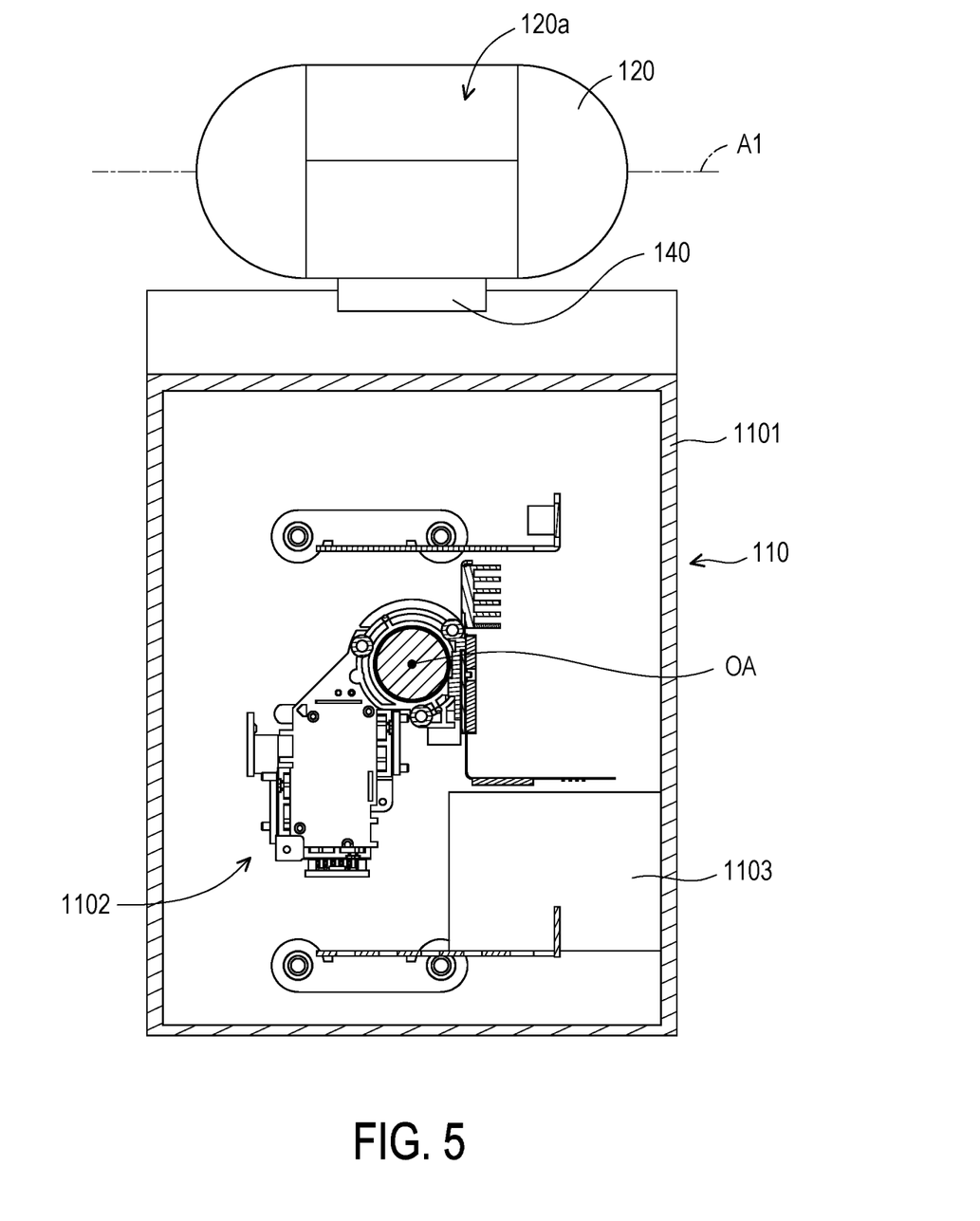
FIG. 5 is a front view of partial structures of the projection apparatus of FIG. 1.
Figure 6:
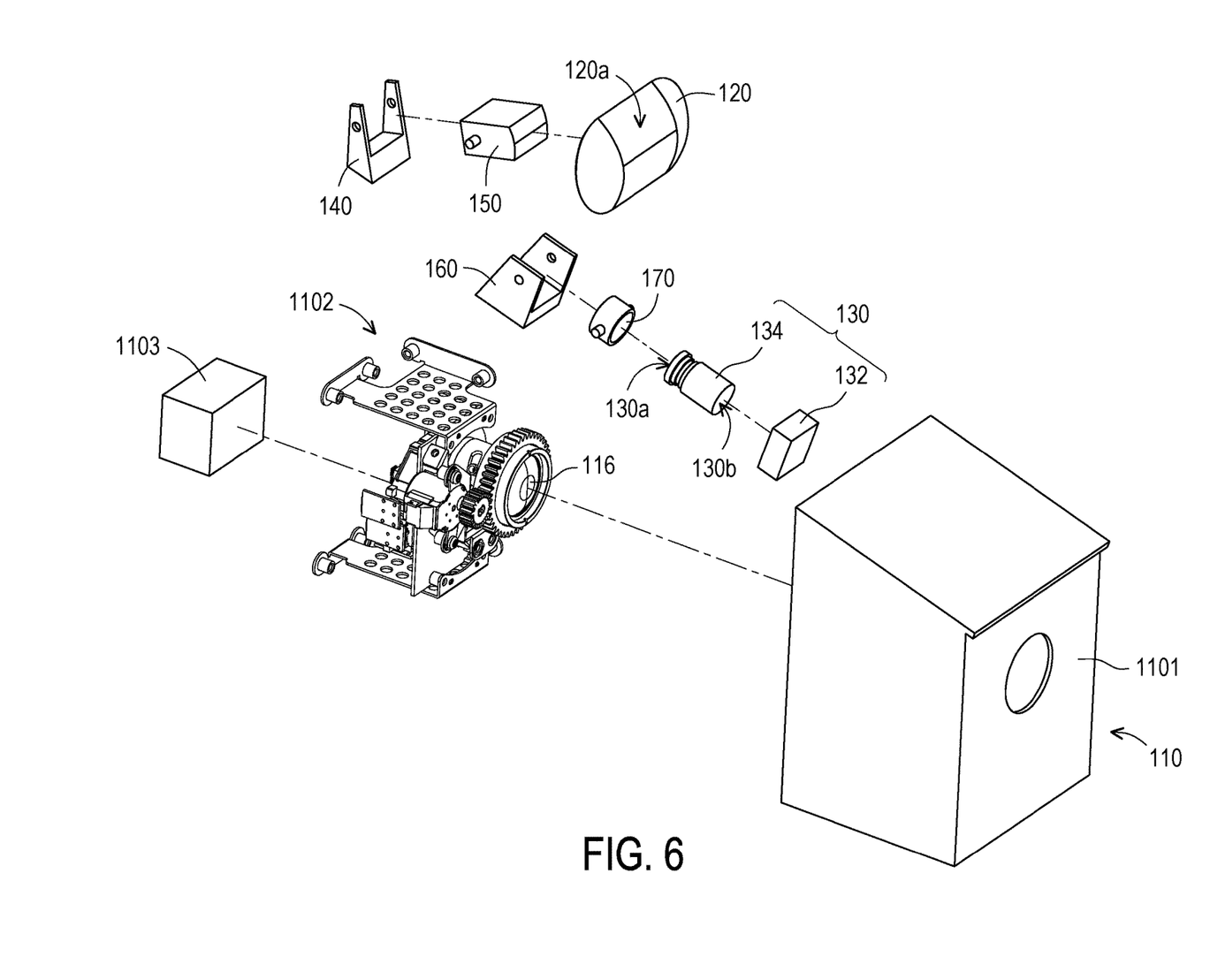
FIG. 6 is an exploded view of the projection apparatus of FIG. 1.

FIG. 4 is a side view of partial structures of the projection apparatus of FIG. 1. FIG. 5 is a front view of partial structures of the projection apparatus of FIG. 1. FIG. 6 is an exploded view of the projection apparatus of FIG. 1. As shown in FIG. 4 to FIG. 6, the projection device 110 of this embodiment includes a casing 1101, an optical engine system 1102, and an image analysis unit 1103. The optical engine system 1102 is disposed in the casing 1101 and includes the light source 112, the light valve 114, and the projection lens 116. The image analysis unit 1103 is disposed in the casing 1101 and is coupled to the image capturing device 130. The image analysis unit 1103 is configured to analyze the projection image I reflected by the reflecting surface 120a and captured by the image capturing device 130, which is taken as a reference for software adjustment of the projection lens 116 such as auto-focusing adjustment and image warp adjustment, or for other image correction purposes not mentioned above.

The configuration of the reflecting component 120 and the image capturing device 130 of this embodiment will be specifically described below. With reference to FIG. 1, the reflecting component 120 is rotatably disposed on the projection device 110 along a first rotation axis A1. The image capturing device 130 is rotatably disposed on the projection device 110 along a second rotation axis A2. The first rotation axis A1 and the second rotation axis A2 are parallel to each other. The first rotation axis A1 and the second rotation axis A2 are perpendicular to an optical axis OA of the projection lens 116 of the projection device 110. The user may adjust the inclination angle of the reflecting component 120 along the first rotation axis A1 and the inclination angle of the image capturing device 130 along the second rotation axis A2, such that the reflecting component 120 reliably reflects the projection image I (shown in FIG. 3) to the image capturing device 130. After the adjustment of the inclination angle of the reflecting component 120 and the inclination angle of the image capturing device 130 is completed, the reflecting component 120 and the image capturing device 130 may be fixed to be maintained in a correct mounting state.

To be more specific, as shown in FIG. 4 and FIG. 6, the projection apparatus 100 of the embodiment also includes a bracket 140 and a rotator 150. The bracket 140 is disposed on the projection device 110. The rotator 150 is pivotally connected to the bracket 140 along the first rotation axis A1. The reflecting component 120 is disposed on the rotator 150. In addition, the projection apparatus 100 also includes a bracket 160 and a rotator 170. The bracket 160 is disposed on the projection device 110. The rotator 170 is a sleeve, for example, and is pivotally connected to the bracket 160 along the second rotation axis A2. The image capturing device 130 includes a photographing component 132 and a focusing lens 134. The focusing lens 134 is disposed on the rotator 170 and has the image capturing end 130a and a rear end 130b (labeled in FIG. 6) opposite to the image capturing end 130a. The photographing component 132 is connected to the rear end 130b of the focusing lens 134. In other embodiments, the reflecting component 120 and the image capturing device 130 may be in other appropriate forms and may be disposed on the projection device 110 in other ways, which is not limited by the disclosure.

In an embodiment, the bracket 140, the rotator 150, the bracket 160, and the rotator 170 and components provided thereon may also be disposed in the projection device 110.

In the disclosure, different designs may be made depending on actual circumstances or user needs.

In summary of the foregoing, in the projection apparatus of the disclosure, the projection image is reflected to the image capturing device by the reflecting component, instead of being directly captured by the image capturing device. Accordingly, the projection image can be correctly reflected to the image capturing device by adjusting the angle of the reflecting component, so that the configuration position and angle of the image capturing device are not limited. In addition, when the size of the projection image is relatively large, wide-angle reflection can be achieved by configuring the reflecting surface of the reflecting component as a convex surface, to prevent photographing from being adversely affected by insufficient viewing angle or aberration of the image capturing device. Thereby, the image capturing device can smoothly capture the projection image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising a projection device, a reflecting component, and an image capturing device, wherein the projection device is adapted to project an image light beam toward a front of the projection apparatus to form a projection image;

the reflecting component is disposed on the projection device and has a reflecting surface, and the reflecting surface faces the front; and the image capturing device is disposed on the projection device and has an image capturing end, wherein the image capturing end faces the reflecting surface and faces away from the front, and the reflecting surface is adapted to reflect the projection image to the image capturing end.

2. The projection apparatus according to claim 1, wherein the reflecting surface is a mirror surface.

3. The projection apparatus according to claim 1, wherein the reflecting surface is a convex arc surface.

4. The projection apparatus according to claim 1, wherein the projection apparatus comprises a light source, a light valve, and a projection lens, the light source is adapted to generate an illumination light beam, the light valve is adapted to convert the illumination light beam into the image light beam, and the projection lens is adapted to project the image light beam.

5. A projection apparatus, comprising a projection device, a reflecting component, and an image capturing device, wherein the projection device is adapted to project an image light beam to form a projection image;

the reflecting component is disposed on the projection device and has a reflecting surface; and the image capturing device is disposed on the projection device and has an image capturing end, wherein the image capturing end faces the reflecting surface, and the reflecting surface is adapted to reflect the projection image to the image capturing end, wherein the reflecting component is rotatably disposed on the projection device along a first rotation axis, the image capturing device is rotatably disposed on the projection device along a second rotation axis, and the first rotation axis and the second rotation axis are parallel to each other.

6. The projection apparatus according to claim 5, wherein the first rotation axis and the second rotation axis are perpendicular to an optical axis of a projection lens of the projection device.

7. A projection apparatus, comprising a projection device, a reflecting component, an image capturing device, a bracket and a rotator, wherein the projection device is adapted to project an image light beam to form a projection image;

the reflecting component is disposed on the projection device and has a reflecting surface; and the image capturing device is disposed on the projection device and has an image capturing end, wherein the image capturing end faces the reflecting surface, and the reflecting surface is adapted to reflect the projection image to the image capturing end, wherein the bracket is disposed on the projection device, the rotator is pivotally connected to the bracket, and the reflecting component is disposed on the rotator.

8. A projection apparatus, comprising a projection device, a reflecting component, an image capturing device, a bracket and a rotator, wherein the projection device is adapted to project an image light beam to form a projection image;

the reflecting component is disposed on the projection device and has a reflecting surface; and the image capturing device is disposed on the projection device and has an image capturing end, wherein the image capturing end faces the reflecting surface, and the reflecting surface is adapted to reflect the projection image to the image capturing end,
wherein the bracket is disposed on the projection device, the rotator is pivotally connected to the bracket, and the image capturing device is disposed on the rotator.

9. The projection apparatus according to claim 8, wherein the image capturing device comprises a photographing component and a focusing lens, the focusing lens is disposed on the rotator and has the image capturing end and a rear end opposite to the image capturing end, and the photographing component is connected to the rear end of the focusing lens.

10. A projection apparatus, comprising a projection device, a reflecting component, an image capturing device and an image analysis unit, wherein
the projection device is adapted to project an image light beam to form a projection image;
the reflecting component is disposed on the projection device and has a reflecting surface;
the image capturing device is disposed on the projection device and has an image capturing end, wherein the image capturing end faces the reflecting surface, and the reflecting surface is adapted to reflect the projection image to the image capturing end; and
the image analysis unit is coupled to the image capturing device and is adapted to analyze the projection image reflected by the reflecting surface and captured by the image capturing device.

* * * * *